United States Patent [19]

Supcoe et al.

[11] Patent Number: 5,488,076
[45] Date of Patent: Jan. 30, 1996

[54] WATER ABLATIVE COATING FOR DRAG REDUCTION APPLICATIONS

[75] Inventors: Robert F. Supcoe, Annapolis, Md.; Francis J. Moran, Jr., Alexandria, Va.

[73] Assignee: The United States of America as represented by the Secretary of the Navy, Washington, D.C.

[21] Appl. No.: 386,658

[22] Filed: Aug. 8, 1973

[51] Int. Cl.⁶ .............................. B05D 5/08; C09D 5/14; B63B 1/34
[52] U.S. Cl. .................. 523/175; 106/15.05; 106/16; 106/17; 106/18; 114/67 R
[58] Field of Search ................. 114/67 R; 106/15.05, 106/16, 18, 17

[56] References Cited

U.S. PATENT DOCUMENTS

| | | | |
|---|---|---|---|
| 3,154,460 | 10/1964 | Graner | 114/67 R |
| 3,230,919 | 1/1966 | Crawford | 114/67 R |
| 3,337,352 | 8/1967 | Sano et al. | 106/15 AF |
| 3,426,473 | 2/1969 | Cardarelli et al. | 106/15 AF |
| 3,435,796 | 4/1969 | Merrill | 114/67 R |
| 3,516,376 | 6/1970 | Kowalski | 114/67 R |
| 3,575,123 | 4/1971 | Shepherd et al. | 114/67 R |
| 3,677,777 | 7/1972 | Ishii et al. | 106/15 AF |
| 3,732,839 | 5/1973 | Schuster et al. | 114/67 R |

*Primary Examiner*—Leland A. Sebastian

[57] ABSTRACT

A paint for application to the exterior surface of waterborne vehicles includes a high molecular weight water soluble polymer with drag reducing properties which time releases into the fluid boundary layer immediately adjacent the vehicle surface to reduce turbulence and promote laminar flow.

19 Claims, No Drawings

WATER ABLATIVE COATING FOR DRAG REDUCTION APPLICATIONS

The invention described herein may be manufactured and used by or for the Government of the United States of America for governmental purposes without the payment of any royalties thereon or therefor.

BACKGROUND OF THE INVENTION

This invention relates to drag reducing means on waterborne vehicles and more specifically to the use of high molecular weight water soluble polymers with drag reducing properties in a water ablative paint coating.

The relative flow of water past the surface of a waterborne vehicle of either the submerged or surface type creates various drag forces which resist the forward movement of the vehicle. One form of drag known as shear is due to the fact that water is slightly viscous and a boundary layer exists immediately adjacent to the submerged surface of the waterborne vehicle. The shearing of the viscous fluid, or water, in this region causes drag. Another contribution to drag results from turbulent flow. At the bow of the vehicle the flow of the liquid along the frontal contour is laminar and fairly uniform, with no apparent evidence of roiliness. This flow continues to a point on the vehicle surface at which smooth flow is interrupted and turbulence become manifest. This results in skin friction or drag. Proceeding to the tail where a fluid pressure rise occurs the boundary layer often separates from the object creating a void or cavity in the fluid. This results in a situation where the object cannot benefit or recover a thrust from the pressure rise at the stern. This suction-like effect is referred to as pressure drag. In summary, all of these drag forces can be considered as reverse forces which contribute to a decrease in speed of an object traversing through water.

Various studies have shown that polyethylene oxide and certain polyacrylamide resins possess properties that minimize drag or skin friction and various proposals have been made in order to provide a means whereby enrichment of the boundary layer with these drag reducing polymers can be effected. These have included the injection of concentrated solutions into the boundary layer and by coating the object with drag reducing polymers. The coating techniques cover sheet production by extrusion and calendering powder spraying at elevated temperatures, and isostatic pressing. Insofar as is known, no proposal has included paint coatings.

SUMMARY OF THE INVENTION

A drag reducing paint which may be applied as a coating on the surface of a waterborne vehicle has various advantages over the prior art techniques for forming drag reducing coatings mentioned above. A drag reducing paint is easy to formulate and can be applied in various thicknesses by brush, roller or spray. It dries to the touch in three to four hours and can be pigmented in any shade or color. Since the drag reducing polymer replaces the coloring pigment in normal coatings, the polymer concentration can be varied from low concentrations to approximately 35%.

OBJECTS OF THE INVENTION

It is an object of this invention to provide an easy and efficient means for reducing drag upon a waterborne vehicle.

It is a further object of this invention to provide a means by which the boundary layer immediately adjacent to the surface of a waterborne vehicle can be enriched with a low concentration of a high molecular weight additive which possesses drag reducing properties.

It is a further object of this invention to provide a water ablative, drag reducing paint which may be easily applied to the surface of a waterborne vehicle by brush, roller, or spray in any desired thickness and color.

Various other objects and advantages will become apparent from the following detailed description of the invention, and the novel features will be particularly pointed out hereinafter in connection with the appended claims.

DETAILED DESCRIPTION

The basic mechanism of the drag reducing paint formulation of this invention is a paint composition that when applied to a surface and dried has a lattice or cell-like structure containing water soluble resin particles which have drag reducing characteristics upon solution. The coating, upon contact with water, permits the water to interact with the polymer, effecting a solution that causes the coated surface to have a slippery friction reducing surface and which enriches the boundary layer of a coated object so that the turbulence of the flow is reduced when the object is propelled through the water. The basic formulation can be altered or modified so that the rate of leaching into the boundary layer may be regulated.

The basic formulation for the drag reducing paint of this invention comprises a mixture of: a high molecular weight water soluble polymer which has drag reducing qualities; a vehicle or resin varnish which serves as a carrier for the drag reducing polymer; a diluent to facilitate ease of application of the mixture by brush, roller, or spray; and driers to hasten drying of the film.

The drag reducing polymer may be selected from polyacrylamide resin, polyethylene oxide resin, guar gum, or any other high molecular weight, water soluble polymers with drag reducing properties. The drag reducing polymer according to this invention may comprise 19 to 35% by weight of the total paint mixture.

The carrier resin may be selected from silicone alkyd resin, shellac resin, long oil alkyd resin or any other air drying alkyd resin which can suspend a water soluble resin in such a way that when applied to a surface and dried, allows the penetration of water and the ablation of the drag reducing polymer resin. According to this invention, the carrier resin may comprise 40 to 55% by weight of the total paint mixture.

The diluent may generally be mineral spirits and is added to thin the mixture to a paint consistency which may be easily applied in a conventional manner by brush, roller, or spray. The proportion of mineral spirits will vary according to the mode of application but according to the invention will remain within the range of 7 to 15% by weight.

The driers comprise 0.75 to 1.5% by weight of the total mixture and may be composed of 50% cobalt napthenate, 25% lead napthenate and 25% manganese napthenate. Of course, any other well known driers may be used within the spirit and scope of the invention.

If desired, coloration of the basic formulation may be effected by the addition of a pigment. The pigment should preferably have a good masking ability, a fine and smooth consistency, and be inert to the rest of the mixture. Titanium dioxide is an example of a pigment with these characteristics. Typically, the pigment may comprise anywhere from 3 to 7% by weight of the mixture.

The method of preparation of the drag reducing paint composition is best performed by ball milling a paste composed of a drag reducing polymer, an alkyd resin, and mineral spirits to a Hegman gauge grind of 5 or 6. To reduce milling time, the initial charges to the mill should be 325 mesh particle size. Upon completion of the milling, the charge is let down or diluted to brush, roll, or spray viscosity, driers and pigments are added as appropriate and the mixture is screened to remove any oversize particles. The particle size is critical in that it tends to produce a smooth finish coating as well as promote rapid solvation when the coating is immersed in water.

EXAMPLE I

An example of the basic formulation prepared in accordance with the above method is:

| Silicone Alkyd Resin | 55% by weight |
|---|---|
| Polyacrylamide Resin | 30% |
| Mineral Spirits | 10% |
| Driers, Pigments | 5% |
| Total | 100% |

The basic formulation coated on an object which is immersed in water is immediately subject to leaching. The leaching of the water soluble resin while the object is in its rest mode, i.e., time in water prior to initiation of propulsion, tends to be uneven due to the resin distribution in the film lattice effecting an uneven surface smoothness or wrinkling. Lattice distortion can be arrested or delayed by regulating water interaction. This has been done by precoating the drag reducing polymer resin with water insoluble and hydrophobic materials. The materials used for these purposes are tricalcium phosphate and fumed silica singly or in combination. Fumed silica is finely divided $SiO_2$ and may be obtained from Cabot Chemical Company under the tradename of Silanox 101. The precoating is performed prior to the ball milling by placing the drag reducing resin in a shaker or tumbler with the tricalcium phosphate and/or the fumed silica and shaking for 30 minutes. This time interval permits a thorough coating of the polymer resin particles with the coating material. The tricalcium phosphate and/or fumed silica may be present in the amount of 0.81 to 1.64% and 2 to 4.1% by weight, respectively. The coating is very thin and tends to delay water interaction so that a uniform leach rate is effected. The uniform leach rate tends to reduce or eliminate wrinkling—the formation of a corrugated surface due to uneven solvent (water) penetration.

EXAMPLE II

An example of the modified basic formulation for effecting a uniform leach rate is:

| Tricalcium Phosphate | 1.62% by weight |
|---|---|
| Fumed Silica | 4.05% |
| Polyacrylamide Resin | 19.88% |
| Titanium Dioxide | 6.62% |
| Silicone Alkyd Resin | 52.97% |
| Mineral Spirits | 13.51% |
| Drier | 1.35% |
| Total | 100.00% |

EXAMPLE III

For a uniform but faster leach rate than afforded by Example II, the following formulation was prepared:

| Tricalcium Phosphate | 0.81% by weight |
|---|---|
| Fumed Silica | 2.02% |
| Polyethylene Oxide Resin | 26.00% |
| Titanium Dioxide | 3.31% |
| Silicone Alkyd Resin | 53.00% |
| Mineral Spirits | 13.51% |
| Drier | 1.35% |
| Total | 100.00% |

In addition to modifying the basic formulation to produce a uniform leach rate, a further modification may be made to effect complete ablation of the coating from the painted surface. Two variations in this modification of the formulation have produced good results. The first of these uses finely divided Teflon resin and the other uses a water soluble film forming resin which would compliment the alkyd resin carrier. In the former case, it is known that the insoluble Teflon resin, if insoluble in the system and if nonreactive with the alkyd resin will weaken adhesion of the film forming alkyd resin varnish upon the substrate. This is primarily due to the inert Teflon resin disturbing the uniformity and continuity of adhesion of the alkyd resin film upon the substrate surface. Both resins have characteristic release properties and require special bonding techniques in order to adhere to a surface. The Teflon additive used in formulation is PLAST-O-LON which comprises insoluble polytetrafluorethylene resin, a product of the Plastomer Corporation, in the range of 0.25 to 1.00% by weight. In performing the preparation, the finely divided Teflon resin which should initially pass a 325 mesh is added to and ball milled with the drag reducing polymer and the alkyd resin.

EXAMPLE IV

An example of the formulation incorporating the teflon resin is as follows:

| Teflon | 0.81% by weight |
|---|---|
| Fumed Silica | 2.02% |
| Polyacrylamide Resin | 26.00% |
| Titanium Dioxide | 3.31% |
| Silicone Alkyd Resin | 53.00% |
| Mineral Spirits | 13.51% |
| Drier | 1.35% |
| Total | 100.00% |

In the second variation of this modification to effect complete ablation, the tendency of the alkyd resin to stick to the surface is reduced by the addition of a second water soluble resin, such as polyvinyl alcohol in the amount of 2 to 4% by weight in the presence of 8 to 10% by weight of methanol. The methanol acts to evenly distribute the polyvinyl alcohol in the alkyd resin upon evaporation. The polyvinyl alcohol and methanol are also ball milled with the other constituents.

EXAMPLE V

An example of this last variation utilizing the modifier for the alkyd resin is:

| | |
|---|---|
| Tricalcium Phosphate | 1.62% by weight |
| Fumed Silica | 2.02% |
| Polyacrylamide Resin | 20.00% |
| Silicone Alkyd Resin | 50.00% |
| Polyvinyl Alcohol | 4.00% |
| Methanol | 10.00% |
| Mineral Spirits | 11.36% |
| Drier | 1.00% |
| Total | 100.00% |

In this last example, the polyvinyl alcohol becomes somewhat brittle upon drying. In order to impart some elasticity to the polyvinyl alcohol, so as to allow the paint to conform to the surface, a plasticizer such as triglycol diacetate in the amount of 2 to 5% by weight may be added.

EXAMPLE VI

An example incorporating the tryglycol acetate is as follows:

| | |
|---|---|
| Tricalcium Phosphate | 1.00% by weight |
| Fumed Silica | 2.00% |
| Polyacrylamide Resin | 25.00% |
| Silicone Alkyd Resin | 43.00% |
| Polyvinyl Alcohol | 4.00% |
| Methanol | 10.00% |
| Triglycol Diacetate | 3.00% |
| Mineral Spirits | 11.00% |
| Drier | 1.00% |
| Total | 100.00% |

It will be understood that various changes in the details, materials and steps which have been described herein to explain the nature of the invention may be made by those skilled in the art within the principle and scope of the invention as expressed in the appended claims.

We claim:

1. A water ablative paint for application to the exterior surface of a waterborne vehicle to reduce drag by reducing turbulence and promoting laminar flow in the boundary layer immediately adjacent the vehicle surface, said paint comprising:

a drag reducing polymer;

a carrier resin for suspending said drag reducing polymer;

a drier; and a diluent.

2. The drag reducing paint of claim 1, wherein:

said drag reducing polymer is a high molecular weight water soluble polymer.

3. The drag reducing paint of claim 2, wherein:

said high molecular weight soluble polymer is selected from the group consisting of polyacrylamide resin, polyethylene oxide resin, and guar gum.

4. The drag reducing paint of claim 1, wherein:

said carrier resin is an air drying resin and suspends said soluble polymer in such a way that when said paint is applied to said surface and dried water penetration is allowed causing ablation of said polymer.

5. The drag reducing paint of claim 4, wherein:

said carrier resin is selected from the group consisting of silicone alkyd resin, shellac resin and long oil alkyd resins.

6. The drag reducing paint of claim 1, wherein:

said diluent is mineral spirits.

7. The drag reducing paint of claim 1, wherein:

said drier is comprised of cobalt napthenate 50% by weight, manganese napthenate 25% by weight and lead napthenate 25% by weight.

8. The drag reducing paint of claim 1, including:

a pigment.

9. The drag reducing paint of claim 7, wherein:

said pigment is titanium dioxide.

10. The drag reducing paint of claim 2, wherein:

said water soluble polymer has a thin coating of a water insoluble and hydrophobic substance to delay water interaction and to promote a uniform leach rate.

11. The drag reducing paint of claim 10, wherein:

said water insoluble and hydrophobic substance coating said water soluble polymer is a mixture of tricalcium phosphate and fumed silica.

12. The drag reducing paint of claim 10, including:

an additive for reducing the adhesion of the carrier resin upon said surface to promote complete ablation of the paint from said surface.

13. The drag reducing paint of claim 12, wherein:

said additive is an inert resin which disturbs the uniformity and continuity of adhesion of the carrier resin upon said surface.

14. The drag reducing paint of claim 13, wherein:

said inert resin is finely divided polytetrafluorethylene resin.

15. The drag reducing paint of claim 12, wherein:

said additive is a water soluble resin.

16. The drag reducing paint of claim 15, wherein:

said water soluble resin is polyvinyl alcohol.

17. The drag reducing paint of claim 15, including:

methanol for evenly distributing the polyvinyl alcohol among said carry resin.

18. The drag reducing paint of claim 17, including:

a plasticizer for imparting an elasticity to the paint.

19. The drag reducing paint of claim 18, wherein:

said plasticizer is triglycol diacetate.

* * * * *